June 1, 1943.    C. L. GLAES ET AL    2,320,425
COMBINING FOAM RUBBER
Filed Aug. 2, 1940
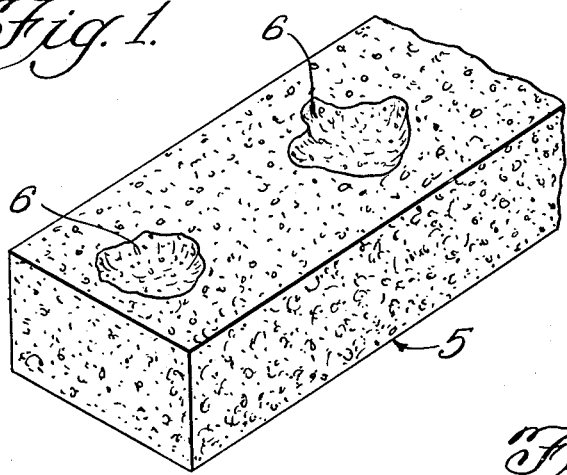
Fig. 1.
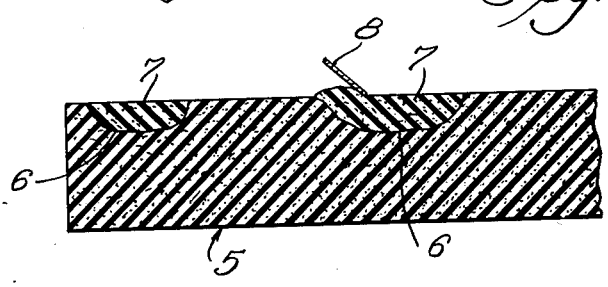
Fig. 2.
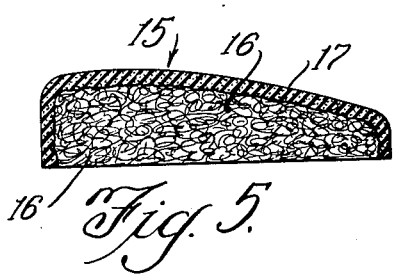
Fig. 5.
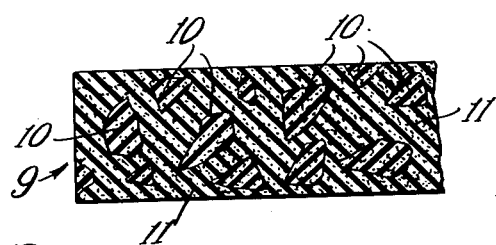
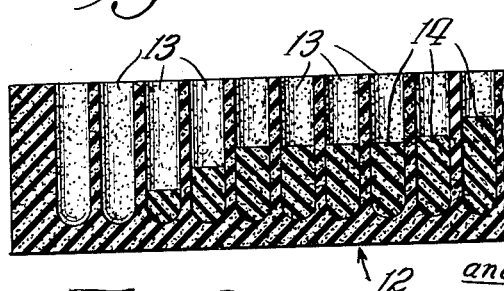
Fig. 4.
Fig. 3.
Inventors:
Charles L. Glaes
and John F. Schott
By Eugene M. Giles
Atty.

Patented June 1, 1943

2,320,425

UNITED STATES PATENT OFFICE 2,320,425

COMBINING FOAM RUBBER

Charles L. Glaes and John F. Schott, Mishawaka, Ind., assignors to Mishawaka Rubber and Woolen Manufacturing Company, Mishawaka, Ind., a corporation of Indiana Application August 2, 1940, Serial No. 350,114

11 Claims. (Cl. 18—53)

Our invention relates to the manufacture of foam rubber articles and has reference more particularly to the combining with vulcanized foam rubber of other foam rubber so as to constitute an integrated mass. The invention contemplates a combining foam rubber which gels at normal temperatures, may be spread and shaped for patching or similar purposes and which cures at a relatively low temperature.

Cushions and other articles are being made quite extensively of foam rubber which is commonly prepared by whipping compounded rubber latex containing a foaming agent into a froth or foam, or by stirring the compounded latex into a separately prepared foam, the foamed latex material being ordinarily poured into a mold by which it is shaped in the desired form and after gelling thereof is vulcanized in the mold. After curing and before drying thereof, the vulcanized foam rubber is rather soft and flabby and quite easily and frequently torn in removal from the molds or in subsequent handling. Moreover, in the molding, undesirable low spots or voids, commonly called "birdies" sometimes occur in the back sides of these foam rubber cushions. No convenient and satisfactory way has been provided heretofore to repair torn out places or to fill such low spots or voids.

Vulcanized foam rubber parts can be cemented together, and it has been the practice heretofore, in the case of torn out places or "birdies" to trim or cut away the foam rubber at the tear or "birdie" to produce a recess of convenient shape to accommodate an insert and to cut a piece of vulcanized foam rubber to the required shape to fit the recess in which it is then secured by cementing. This method, however, not only is tedious and requires painstaking care to make a neat job but moreover the articles repaired in this manner are usually classed as seconds and sell at a lower price.

Moreover, it is oftentimes desirable to rework cushions or the like of foam rubber to alter the shape or size thereof or to increase the resistance locally or otherwise to compression or even to make up an entirely different cushion or article therefrom and in such reworking, on account of the necessity of filling in or covering certain places or areas with foam rubber, the same problem is encountered.

Furthermore in the manufacture of foam rubber articles, there is considerable accumulation of vulcanized scrap such as the foam rubber which extrudes from the molds through openings between the mold and mold cover and elsewhere and is trimmed off after vulcanization, and as foam rubber is a relatively expensive material it is important to utilize this material in a manner to realize therefrom a return commensurate with its cost. Heretofore it has been quite difficult to dispose of this scrap to advantage.

The principal objects of our invention are to provide an improved method and composition for conveniently and satisfactorily repairing foam rubber articles or for other purposes wherein it is desired to combine foam rubber with already vulcanized foam rubber; to insure an intimate amalgamation whereby the newly added foam rubber becomes practically a part of the original mass; to permit patching, repairing and the like without depreciation in the value of the foam rubber article; to accomplish the patching or repairing without requiring a form, mold or any special equipment or facilities; and to provide a profitable use for scrap foam rubber, these and other objects being accomplished as more fully explained hereinafter, and illustrated in the accompanying drawing in which:

Fig. 1 is a perspective view of a portion of a vulcanized sponge rubber body having torn out recesses or so-called "birdies" in one face thereof.

Fig. 2 is a vertical longitudinal section through a sponge rubber body similar to that of Fig. 1 and showing the filling of the recesses with foam rubber in acocrdance with the present invention.

Fig. 3 is a vertical section through a composite sponge rubber body made of fragments of vulcanized sponge rubber combined with other foam sponge rubber in accordance with our invention.

Fig. 4 is a vertical section through a sponge rubber cushion or the like having cored out cavities, certain of the same being partially filled with other foam sponge rubber which is combined with the sponge rubber of the cushion in accordance with our invention; and Fig. 5 is a sectional view of a hair pad covered with foam rubber as contemplated herein as a feature of the invention.

For the purpose of our present invention, two different foam rubber compounds are employed, one of these, which is referred to hereinafter as the cushion compound, being a relatively high temperature curing compound from which the cushions or other articles are made, and the other, which is referred to hereinafter as the patching compound, being a compound which gels or sets quite rapidly at normal or room temperatures and cures at a relatively low temperature, this latter patching compound being employed for patching, repairing and reworking the cushions or articles made of the high temperature curing cushion compound and for reusing the vulcanized scrap from the latter compound.

In practice we make the cushions or other foam rubber articles of a foam rubber compound which vulcanizes at a temperature of approximately 220° F., and which, for example, may be prepared as follows:

To three gallons of creamed or concentrated latex (approximately 60% solids and low ammonia content of 0.5% or less) is added 1010 grams of a batch of compounding ingredients composed of the following:

|  | Pounds | Ounces |
|---|---|---|
| Casein (insoluble) | 1 | 12 |
| Water | 33 | 8 |
| Ammonia, 28% |  | 7 |
| Tetramethyl thiuram disulphide | 3 |  |
| Triethyl trimethylene triamine | 6 |  |
| Licorice powder | 3 | 11 |
| Zinc oxide | 9 | 11 |
| Neozone D (phenyl beta-napthylamine) | 18 |  |
| Sulphur | 11 | 10 |

These compounding ingredients being ground together and finely divided and forming a paste, 1010 grams of which is gently stirred into the three gallons of latex.

A foaming ingredient may then be added to the compounded latex and the mixture whipped into a froth or foam or a foam may be prepared separately and have the compounded latex incorporated therein.

For example a separately prepared foam may be made of

Ammonium linoleate_____grams__ 150
Neutral soap_____do____ 15
Boiling water_____c. c__ 850 which is mixed together and then whisked at high speed in the open bowl of a mechanical mixer until all the liquid is converted into foam after which the three gallons of latex containing the 1010 grams of compounding ingredients or paste is gently stirred into the foam until thoroughly dispersed or distributed throughout the foam. The amount of ammonium linoleate and boiling water of the above formula may be increased if a softer texture of finished product is desired or decreased if a harder and less compressible material is desired.

For patching, repairing or reworking cushions or articles made of this foamy cushion compound a cold gel compound is employed which may consist of the following:

|  | Grams | Parts per 100 parts Latex solids | |
|---|---|---|---|
|  |  | Dry | Wet |
| Compounded latex | 750. | 102.542 | 165.300 |
| Zinc oxide sulfur | 78.40 | 7.987 | 17.270 |
| Sodium silicofluoride | 8.24 | 0.964 | 1.820 |
| Triethyl trimethylene triamine | 4.13 | 0.228 | 0.913 |
| Water | 8.24 |  | 1.820 |
| Ammonium hydroxide | 0.50 |  | 0.135 |
|  | 849.51 | 111.721 | 187.258 |

These materials are mixed togther and whipped into a foam in a mechanical beater and provide a foam which sets or gels in a reasonably short time at normal or room temperature and which may be spread and shaped with a spatula or the like for patching or repairing and which vulcanizes at a temperature of approximately 200° F.

In practice, the compounded latex for use in the above cold gel formula is usually made up in large batches and the proper amount thereof (750 grams) is weighed out for use in preparing the batch of cold gel according to the above formula.

A typical batch of compounded latex which we have found satisfactory for the purpose consists of the following:

|  | Pounds | Ounces |
|---|---|---|
| Latex (62% solids) | 14,194 |  |
| Potassium oleate | .440 |  |
| Ethyl zimate | .48 | 13 |
| Accelerator (OXAF) | .146 | 10 |
| Sulfur | .29 | 5 |
| Castor oil soap | 125 | 11 |

In preparing the above batch of compounded latex the latex and 220 pounds of the potassium oleate are mixed together, the castor oil soap and 220 pounds of the potassium oleate are mixed together and the ethyl zimate, accelerator and sulfur are mixed together, after which these three separate mixtures are put together and beaten, the latex and potassium oleate (220 pounds) mixture being added and beaten in last.

With this above described cold gel patching foam, foam rubber cushions or other articles made of the high temperature curing cushion compound, which have torn out places or undesirable low spots or voids or so-called "birdies" may be readily repaired by merely filling in the torn out place or "birdies" with the foamed patching compound and smoothing same off to the desired level or contour after which the entire cushion or article is subjected to a temperature of approximately 200° F. for a period of approximately four hours to vulcanize the patch or filling of foamed patching compound.

This patching of torn out places or "birdies" is illustrated in Figs. 1 and 2 of the accompanying drawing in which 5 indicates a vulcanized cushion or other article of the higher temperature curing compound wherein torn places or "birdies" 6 have occurred. To repair these torn places or "birdies" unvulcanized foam rubber of the lower temperature curing type is applied in the cavities or "birdies" 6 as indicated at 7 so as to fill same and is smoothed off with a blade or spatula 8 or otherwise to correspond to the cushion surface after which these fillings 7 are vulcanized at the lower temperature for which the compound has been prepared and thus are solidified and consolidated with the vulcanized foam rubber of the body 5 so that they become practically an indistinguishable integral part thereof. While the fillings 7 appear in the drawing to be quite distinct from the body 5 of sponge rubber, it is to be understood that the showing of the drawing is exaggerated in this respect for illustration purposes.

Because of the slow cure and the relatively low temperature employed for vulcanizing the patch or filling of foamed patching compound, the already cured cushion or article of the higher temperature curing foam is not detrimentally affected by the patching compound curing to which it is subjected and at the same time the patching compound becomes intimately combined with and bonded to the already cured cushion so that it becomes in effect an original part of the cushion and the latter is in no way impaired or depreciated in value because of the patching or repair.

Likewise, by using this patching compound, cushions or articles of the higher temperature curing cushion compound may be reworked or rebuilt into first class products, as any voids may be neatly filled in and the cushion or article nicely resurfaced where necessary so that the rebuilt or reworked cushion, after vulcanization of the applied patching compound, is in appearance and otherwise the equivalent of a regularly made foam rubber cushion.

Pieces of the high temperature cure foam rubber may be cemented together to form a body which is completed or surfaced with the patching compound or cushions or other articles may be made of the patching compound with scraps of the high temperature curing cushion compound incorporated therein, thereby utilizing these scraps advantageously without sacrifice or loss. For example, these foam rubber scraps may be introduced in a mold and the latter filled in around and between the scraps with the patching foam rubber which when vulcanized thus has the scraps intimately incorporated therein. Moreover, colored scraps, blocks or the like may also be employed with a patching compound of different color and arranged for exposure at the surface of the article so as to produce an attractive and pleasing effect.

Fig. 3 illustrates the manner in which sponge rubber scraps may be conveniently utilized in accordance with the present invention. This figure, although likewise exaggerated for the purpose of clear illustration, is intended to show a body of foam sponge rubber, indicated as a whole at 9, composed of scraps 10 of the higher curing vulcanized sponge incorporated in the foam sponge rubber 11 of the lower temperature curing type which is vulcanized with the already vulcanized scraps 10 therein, thus combining the scraps 10 and added foam rubber 11 into a substantially homogeneous sponge rubber mass. The vulcanized scraps 10 may be introduced into a mold of the desired cushion size and shape and the mold then filled with the unvulcanized foam sponge rubber of the lower vulcanizing temperature than that of the scraps, so that the said scraps are distributed throughout the foam 11 in the mold. Thereafter the composite material is subjected to a vulcanizing heat at a temperature lower then that at which the scraps 10 were cured, the resulting product being substantially as shown in Fig. 3, it being understood however that the finally vulcanized product is a substantially homogeneous one, the marked distinction between the two rubber materials in the drawing being for the purpose of clear illustration.

Cushions of foam rubber are usually made with cored out cavities in the under side and it is sometimes desirable with such cushions to increase their resistance to compression at selected locations or even throughout the entire area thereof. This can be readily accomplished with the present invention, as illustrated in Fig. 4 of the drawing, by filling or partially filling selected cored out cavities with the patching compound which of course, is then vulcanized so that it becomes in effect an integral part of the original cushion. In this Fig. 4 there is shown a vulcanized sponge rubber cushion 12 provided with cored out cavities 13. Some of these cavities 13 have been partially filled with foam sponge rubber 14 of the type hereinbefore mentioned which will vulcanize at a temperature lower than that at which the cushion 12 was cured. As previously indicated, it will be appreciated that the foam sponge fillings 14 become, after vulcanization thereof in the cavities, a substantially homogeneous part of the cushion and of the walls surrounding the cavities 13, although the distinctiveness of the fillings 14 from the cushion body 14 has been exaggerated in the drawing for the purpose of illustration.

Moreover this patching compound, because of its cold gel and low temperature vulcanization characteristics may also be used advantageously for other purposes, as for example to cover hair pads or the like. The compound may be spread over the surface of such pads to a desired thickness so as to fill any depressions or irregularities in the surface of the pad and provide a soft smooth surface and because of the low vulcanizing temperature may be cured in place on the hair pad without any detrimental effect thereon.

Fig. 5 is illustrative of a hair pad covered with foam rubber as above explained and shows a seat cushion 15 composed of the hair pad 16 of substantially the cushion shape and provided with the covering 17 of foam rubber.

This foam rubber 17, while in a spreadable condition, is spread upon the surfaces of the hair pad 16 thereby being molded against the rough hair pad surface so as to fill and conform to the depressions and irregularities of the pad surface, and the outer surface of the foam rubber covering 17 is of course smoothed off as desired. Because of its cold gel characteristics, the foam sets up sufficiently during the spreading operation to remain in place and retain its shape on the pad surface, and because of the low vulcanization temperature this foam covering 17 may be cured on the hair pad 16 without detrimental effect on the pad.

From the foregoing it will be understood that in accordance with our invention, foam rubber cushions and other articles may be conveniently and satisfactorily repaired, reworked and the like without impairing or depreciating the value thereof.

Moreover, the invention has the advantage that the patching compound gels quite rapidly and patches or fillings thereof are self sustaining and will not lose their shape before vulcanization. No molds, forms or special equipment is required for patching or repairing. Cushions or other articles patched or repaired with the patching compound do not require immediate vulcanization but may be vulcanized even as late as a week after the patching compound has been applied. Thus the foam rubber cushions or other articles may be patched or repaired from time to time until a quantity have accumulated and the entire lot then vulcanized at one time thereby avoiding the inconvenience of specially vulcanizing each cushion or small quantities of cushions as soon as they have been patched or repaired. Furthermore our invention provides a use for scrap foam rubber which avoids the loss ordinarily experienced therewith and increases the usefulness of foam rubber as a filler, covering or the like for materials in connection with which the usual foam rubber compounds cannot be satisfactorily employed.

While we have described our invention in a preferred form, we are aware that various changes and modifications may be made without departing from the principles of our invention, the scope of which is to be determined by the appended claims.

We claim as our invention:

1. The method of combining two foamed rubber compounds which comprises vulcanizing one compound at a relatively high temperature and thereafter vulcanizing the other compound at a substantially lower temperature in contact with the vulcanized compound.

2. The method of vulcanizing foam rubber to previously vulcanized foam rubber which comprises applying to the vulcanized foam rubber an unvulcanized foam rubber which vulcanizes at a temperature substantially lower than the vulcanizing temperature of the previously vulcanized foam rubber, and then vulcanizing the applied foam rubber at such substantially lower temperature.

3. The method of vulcanizing a foam rubber to a previously vulcanized foam rubber which comprises applying to the previously vulcanized foam rubber an unvulcanized foam rubber of a vulcanization temperature lower than the vulcanization temperature of said previously vulcanized foam rubber, and then subjecting both foam rubbers to a vulcanizing temperature substantially lower than the temperature at which the previously vulcanized foam rubber was vulcanized until the unvulcanized foam rubber is cured.

4. The method of repairing a vulcanized high temperature cure foam rubber article which comprises applying thereto a cold gel low temperature cure foam rubber, shaping the cold gel to conform to the surrounding surface contours, and then subjecting the article to a protracted low temperature cure.

5. The method of manufacturing composite foam rubber goods, which comprises incorporating pieces of high temperature cured foam rubber into a low temperature cure foam rubber gel, shaping the composite mass, and then vulcanizing the mass at a temperature substantially below the vulcanizing temperature of the pieces.

6. As a new article of manufacture, a vulcanized body of high temperature cure foam rubber having a low temperature cure foam rubber vulcanized thereto.

7. As a new article of manufacture, a body of vulcanized high temperature cure foam rubber having a body of low temperature cure foam rubber vulcanized thereto.

8. As a new article of manufacture, a body of vulcanized low temperature cure foam rubber containing pieces of vulcanized high temperature cure foam rubber.

9. As a new article of manufacture, a body of relatively high temperature cure vulcanized spongy rubber having a lower temperature cure foam rubber vulcanized thereto.

10. As a new article of manufacture, a recessed body of relatively high temperature cure vulcanized spongy rubber, and a lower temperature cure foam rubber in the recess and vulcanized to the spongy rubber body.

11. The method of combining two spongy rubber compounds which comprises preparing two vulcanizable sponge rubber compounds one of which is a cold gelling foam and the other of which vulcanizes at a higher temperature than the vulcanization temperature of the cold gelling foam, vulcanizing the higher temperature vulcanizing compound, then applying thereto the cold gelling foam and allowing the latter to gel, and then vulcanizing the gelled foam at a lower temperature than that at which the first compound was vulcanized.

CHARLES L. GLAES.
JOHN F. SCHOTT.